(12) United States Patent
Jaros et al.

(10) Patent No.: US 7,472,017 B2
(45) Date of Patent: Dec. 30, 2008

(54) METHOD AND CONTROL DEVICE FOR TRIGGERING SOLENOID VALVES ASSIGNED TO GAS-EXCHANGE VALVES

(75) Inventors: Rolf Jaros, Backnang (DE); Hubert Schweiggart, Stuttgart (DE); Ulf Pischke, Stuttgart (DE); Hermann Gaessler, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/540,413

(22) PCT Filed: Jun. 24, 2003

(86) PCT No.: PCT/DE03/02089

§ 371 (c)(1),
(2), (4) Date: Jan. 14, 2008

(87) PCT Pub. No.: WO2004/061275

PCT Pub. Date: Jul. 22, 2004

(65) Prior Publication Data

US 2008/0109151 A1 May 8, 2008

(30) Foreign Application Priority Data

Dec. 24, 2003 (DE) ................ 102 61 022

(51) Int. Cl.
*G06F 19/00* (2006.01)
*F02M 51/00* (2006.01)
(52) U.S. Cl. ............... 701/115; 123/478; 123/490
(58) Field of Classification Search .......... 123/321, 123/322, 345–348, 90.1, 90.12, 90.15–90.17, 123/490, 472, 478, 480; 701/115, 101, 103, 701/104; 239/585.1; 361/154, 155
See application file for complete search history.

(56) References Cited

U.S. PATENT DOCUMENTS 4,009,695 A 3/1977 Ule (Continued)

FOREIGN PATENT DOCUMENTS

DE 26 29 532 1/1977

(Continued)

*Primary Examiner*—John T Kwon
(74) *Attorney, Agent, or Firm*—Kenyon & Kenyon LLP

(57) ABSTRACT

A method for triggering solenoid valves assigned to gas-exchange valves in an electrohydraulic valve activation of an internal combustion engine having a plurality of combustion chambers. The solenoid valves assigned to the gas-exchange valves may be activated independently of each other. To this end, crankshaft-synchronous trigger signal for solenoid valves of the internal combustion engine are ascertained in a control unit and transmitted to an output stage. The output stage controls the solenoid valves on the basis of the transmitted trigger signals. Each combustion chamber of the internal combustion engine has at least one intake valve and at least one discharge valve as gas-exchange valve. All solenoid valves of all gas-exchange valves of a combustion chamber form a solenoid-valve set. One activation profile in each case is specified for all solenoid valves of a solenoid valve set. In the control unit, a crankshaft-synchronous activation signal is ascertained for each combustion chamber and supplied to the output stage. The output stage triggers the solenoid valves of the solenoid-valve set on the basis of the activation signal of the cylinders according to the activation profile stored for the individual solenoid valve.

18 Claims, 2 Drawing Sheets

U.S. PATENT DOCUMENTS

| | | | |
|---|---|---|---|
| 5,115,782 A | | 5/1992 | Stutzenberger et al. |
| 5,201,296 A | | 4/1993 | Davis et al. |
| 5,419,301 A | * | 5/1995 | Schechter ................... 123/673 |
| 5,456,223 A | * | 10/1995 | Miller et al. ............. 123/90.12 |
| 5,497,736 A | * | 3/1996 | Miller et al. ............. 123/90.13 |
| 6,067,946 A | * | 5/2000 | Bunker et al. ............ 123/90.12 |
| 6,681,729 B2 | * | 1/2004 | Gaessler et al. .......... 123/90.11 |
| 6,802,299 B2 | * | 10/2004 | Mischker et al. ............ 123/480 |
| 7,124,717 B2 | * | 10/2006 | Gaessler et al. ................ 123/64 |
| 2002/0166539 A1 | * | 11/2002 | Gaessler et al. ............. 123/404 |
| 2003/0183202 A1 | * | 10/2003 | Mischker et al. ............ 123/480 |
| 2004/0069255 A1 | * | 4/2004 | Schlembach et al. ..... 123/90.12 |
| 2006/0137633 A1 | * | 6/2006 | Schweiggart et al. .... 123/90.12 |

FOREIGN PATENT DOCUMENTS

| | | |
|---|---|---|
| EP | 1 109 286 | 6/2001 |
| JP | 09-308143 | 11/1997 |
| JP | 10-052006 | 2/1998 |
| JP | 2000-023397 | 1/2000 |

* cited by examiner

METHOD AND CONTROL DEVICE FOR TRIGGERING SOLENOID VALVES ASSIGNED TO GAS-EXCHANGE VALVES

FIELD OF THE INVENTION

The present invention relates to a method and a device for triggering solenoid valves assigned to gas-exchange valves.

BACKGROUND INFORMATION

In the case of internal combustion engines, it is known to replace the conventional valve mechanism having camshafts by an electrohydraulic valve actuation. In such an electrohydraulic valve actuation, the gas-exchange valves are assigned solenoid valves, which control the inflow and outflow of a pressurized fluid—an hydraulic oil—into the working chamber of an hydraulic working cylinder. The position of the corresponding gas-exchange valve is modified via the charge of the working chamber of the hydraulic working cylinder.

The advantage of such an electrohydraulic valve timing is that the individual gas-exchange valves of the internal combustion engines may be actuated independently of each other. This provides great variability of the opening and closing instants of the gas-exchange valves. The variability is given both among the gas-exchange valves of different combustion chambers and also among the gas-exchange valves of an individual combustion chamber. By appropriate coordination of the actuation of the solenoid valves, for instance, the valve actuation of two gas-exchange valves having the same function, i.e., two intake valves or two discharge valves, may be synchronized and any existing component tolerances or system-intrinsic deviations be compensated in synchronism.

It is thus known from electrohydraulic valve actuations to ascertain a trigger signal for each individual solenoid valve in a control device, in time-synchronism with the crankshaft motion and possibly as a function of the driving state of the vehicle, the operating states of the internal combustion engine and also as a function of driver inputs. This signal is transmitted to an output stage via an appropriate trigger line. In response to the actuation signal, the corresponding solenoid valve will then be triggered by means of the output stage.

This assumes that a separate control line between the control device and the output stage is provided for each solenoid valve, which causes high cabling expenditure and requires correspondingly higher computing power in the control device. Each actuating signal of the control device must be ascertained and generated in synchronism with the crankshaft.

SUMMARY

It is an object of the present invention to reduce the wiring, computing and control outlay required for the activation of the solenoid valves while retaining an individual activation of the gas-exchange valve with respect to each other.

This object may be achieved by the method and the devices of the present invention.

The present invention relates to a method for triggering solenoid valves assigned to gas-exchange valves in an electrohydraulic valve actuation of an internal combustion engine having a plurality of combustion chambers. The solenoid valves assigned to the gas-exchange valves may be activated independently of each other. To this end, crankshaft-synchronous trigger signals for solenoid valves of the internal combustion engine are ascertained in a control unit and transmitted to an output stage. The output stage controls the solenoid valves on the basis of the transmitted trigger signals. Each combustion chamber of the internal combustion engine has at least one intake valve and at least one discharge valve as gas-exchange valve. According to the present invention, all solenoid valves of all gas-exchange valves of a combustion chamber form a solenoid valve set. In each case, an activation profile is specified for all solenoid valves of a solenoid valve set. A crankshaft-synchronous activation signal is ascertained for each combustion chamber in the control unit and supplied to the output stage. The output stage controls the solenoid valves of the solenoid valve set based on the activation signal of the cylinders in accordance with the activation profile stored for the individual solenoid valve.

This procedure is based on the fact that while considerable differences may exist between the solenoid valves of different gas-exchange valves of a combustion chamber, the activation of all solenoid valves nevertheless follows a basic pattern, no great variance existing among equivalent solenoid valves of different combustion chambers. For that reason, an activation profile for each solenoid valve of a solenoid valve set is first generated in the control unit.

This determination and the transmission of this information does have to be implemented rapidly, but not in synchronism with the crankshaft. The triggering of the individual solenoid valves and their synchronization with respect to the crankshaft is implemented via the activation signal assigned to the corresponding combustion chamber. This ensures a combustion-chamber-individual synchronization, while the profile of the solenoid-valve activations of equivalent solenoid valves of the different combustion chambers corresponds to each other.

Due to the constant recalculation of the activation profiles for the solenoid valve set, the activation instants of the solenoids valves are able to be continuously adapted to the instantaneous driving state, and the driving wish of the driver may be implemented. In general, the variability and adaptability of the activation instants and activation durations of the gas-exchange valves of the internal combustion engine are maintained. Nevertheless, a synchronization of the recalculation with respect to the crankshaft is no longer required. The triggering may be implemented not only in synchronism with the crankshaft, but simultaneously in a time-synchronous manner as well.

According to an advantageous development of the present invention, a specific activation profile may be ascertained for each individual solenoid valve of the solenoid valve set. In this way, the activation of the solenoid valves is largely adapted to the driving state.

According to an advantageous development of the present invention, the activation signal for each individual cylinder may be a binary signal, may be ascertained in the control device, and may be transmitted to the output stage. The binary signal is an easily generated signal whose information content is sufficiently high. Furthermore, it may be advantageous if the activation signal for each individual cylinder is transmitted to the output stage on a cylinder-specific activation-signal line. In this way, a mutual decoupling of the activation signals of the various activation signals is achieved in a simple manner.

According to an advantageous development of the present invention, the output stage may activate the solenoid valves of a cylinder on the basis of the value change of the activation signal of this cylinder in accordance with the corresponding activation profile. In particular in connection with a binary signal, a change from the first to the second value of the activation signal may have a different function than a change from the second to the first value of the activation signal.

According to a preferred development, the activation of solenoid valves assigned to the intake valves is carried out on the basis of a first value change between two values of the activation signal, and the activation of solenoid valves assigned to the discharge valves is carried out on the basis of a second value change between two values of the activation signal, the second value change differing from the first.

According to a preferred development of the present invention, activation profiles may be determined in the control device and transmitted via a data line to the output stage, where they are stored in a memory unit for use in the triggering of the solenoid valves. In the process, the activation profiles stored in the memory unit of the output stage are updated during the operation of the output stage, to values preferably newly ascertained in the control device.

According to an advantageous development of the present invention, an activation profile is made up of a rectangular profile, which defines the onset and the duration of the activation of the solenoid valve with respect to the instant established by the corresponding activation signal. According to a preferred development of the present invention, an activation profile may be made up of the specification of four consecutively occurring time durations. The first time duration represents the length of a waiting time; the second time duration defines the duration of an application of a pull-up voltage at the solenoid valve; the third time duration determines the length of a free-flight phase, and the fourth duration is the duration of an application of a holding voltage at a solenoid valve.

According to a preferred development of the present invention, an adaptation set may be determined in the control device, the adaptation set including a solenoid-valve-specific adaptation of the values of the activation profile for solenoid valves of a solenoid valve set. The values of the adaptation set are transmitted from the control device to the output stage, in particular by means of a second data line, which is separate from the first data line. For each solenoid valve set, one adaptation group of adaptation sets is preferably determined for all solenoid valves of the solenoid valve group. This measure allows an individual solenoid valve activation of each solenoid valve. Different activation times with respect to the individual activation signal may also be achieved between equivalent solenoid valves of different solenoid valve sets. As a result, the individual solenoid valves remain independent of one another. This development of the present invention thus combines the advantage of reduced computing and control-line outlay and the advantages of an independent valve actuation. This may be utilized in particular due to the fact that the temporal change in the characteristic of equivalent solenoid valves of different solenoid valve groups with respect to each other occurs relatively slowly, for instance as a result of deviating temperature developments among the solenoid coils of the solenoid valves, whereas the change in the activation profiles of the solenoid valve sets occurs more often and more rapidly due to the driving condition.

The subject matter of the present invention also includes a circuit arrangement for triggering solenoid valves assigned to gas-exchange valves. Trigger signals for the activation of the solenoid valves are determined in a control unit. The control unit transmits signals to an output stage via corresponding lines. The output stage triggers the solenoid valves. According to the present invention, the lines between the control unit and the output stage are data lines for the transmission of activation profiles of solenoid valves and activation-signal lines for the crankshaft-synchronous activation of the actuation of the solenoid valves of cylinders in response to activation signals.

According to the present invention, the required cabling between control unit and output stage may be considerably reduced due to the provision of the activation-signal lines and the one data line. The number of lines is reduced because the output stage is able to trigger a multitude of solenoid valves via the signal from an activation-signal line since the solenoid valves have been combined into solenoid valve groups.

According to an advantageous development, an activation-signal line between control unit and output stage may be provided for each cylinder. According to an advantageous development of a circuit arrangement according to the present invention, a second data line is provided to transmit the adaptation sets. Furthermore, it may also be advantageous if the output stage includes a memory unit for storing at least the actuation profiles of the solenoid valve sets.

In addition, in one advantageous development of the present invention, a processing unit is provided in the output stage to ascertain the trigger signals from the activation profiles and the activation signals and possibly from the adaptation sets.

BRIEF DESCRIPTION OF THE DRAWINGS

Furthermore, the present invention explained in greater detail with reference to an exemplary embodiment shown in the figures.

DETAILED DESCRIPTION OF EXAMPLE EMBODIMENTS

Figure 1:
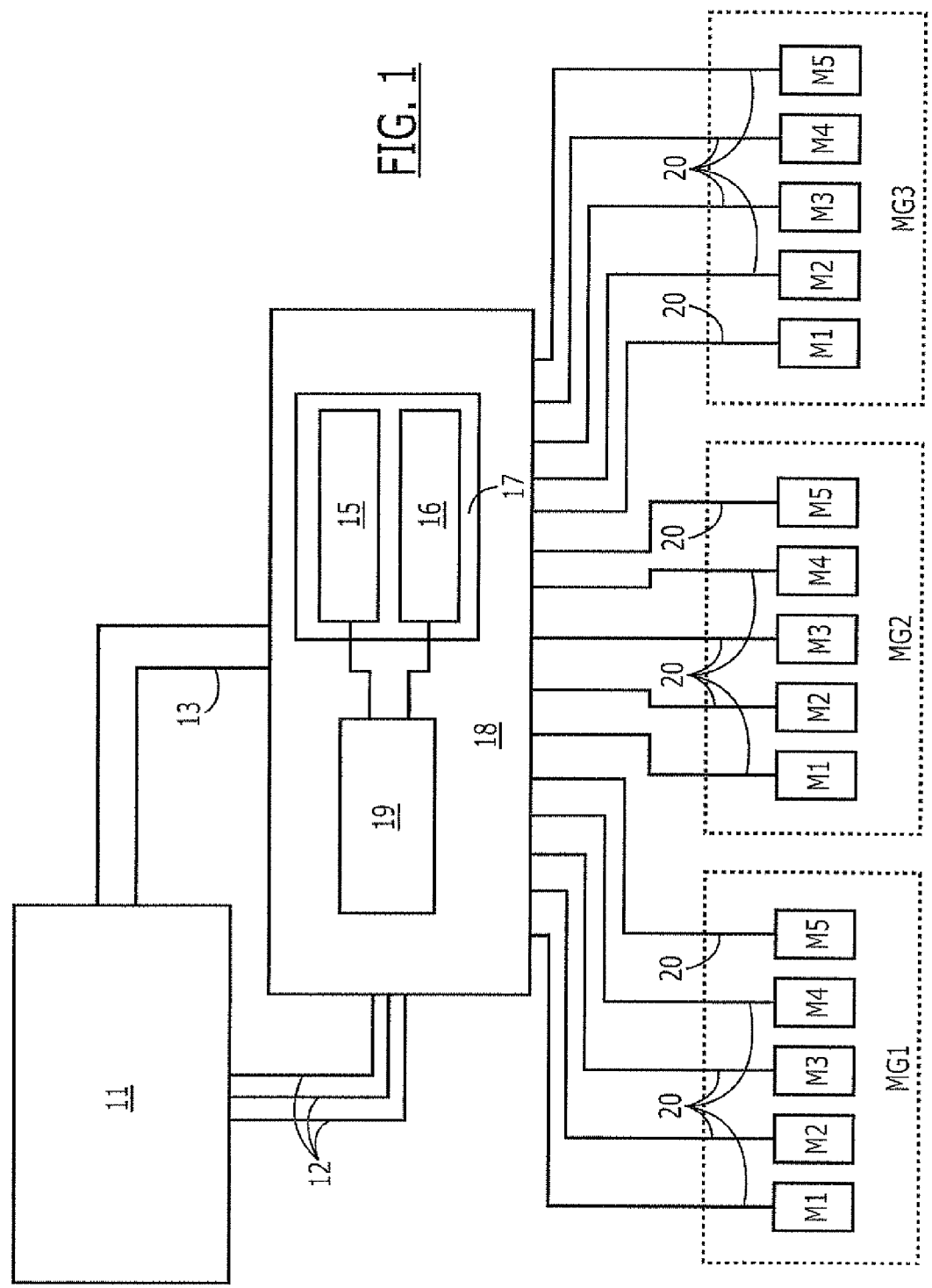
FIG. 1 shows a schematic representation of an example circuit configuration according to the present invention.

FIG. 1 shows an example circuit arrangement 10 according to the present invention in a schematic representation. The circuit arrangement has a control device 11 in which the activation profiles and the adaptation sets are ascertained. The control device is connected to output stage 18 via a plurality of lines 12, 13, 14. First data line 12 is used to transmit the activation profiles; second data line 13 transmits the adaptation sets. A memory 17 in which a first memory 15 is provided to store the activation profiles and a second memory 17 to store the adaptation sets, is available in output stage 18. In addition, activation-signal lines 12 are formed between control device 11 and output stage 18. One activation-signal line 12 is provided for each solenoid valve set MG1, MG2, MG3.

A processing unit 19 in output stage 18 ascertains the trigger signals from the activation profiles stored in memory 17 and the adaptation sets. The activation signals transmitted via activation-signal lines 12 energizes trigger lines 20, which in each case lead to a specific solenoid valve M1, ..., M5 of one of solenoid valve sets MG1, ..., MG3. Same-numbered solenoid valves Mi of solenoid valve sets MG1, ..., MG3 are solenoid valves that correspond to one another, which are triggerable by the same activation profile, possibly with the exception of an adaptation based on an adaptation set.

Solenoid valves M1, ... M5 in each case form a solenoid valve set MG1, ..., MG3. For the purpose of simplification, three solenoid valve sets having five solenoid valves Mi, i=1, ..., 5 in each case are shown in FIG. 1. However, the number of solenoid valves Mi in a solenoid valve set is also adaptable according to the specific circumstances, as is the number of solenoid valve sets.

Figure 2:
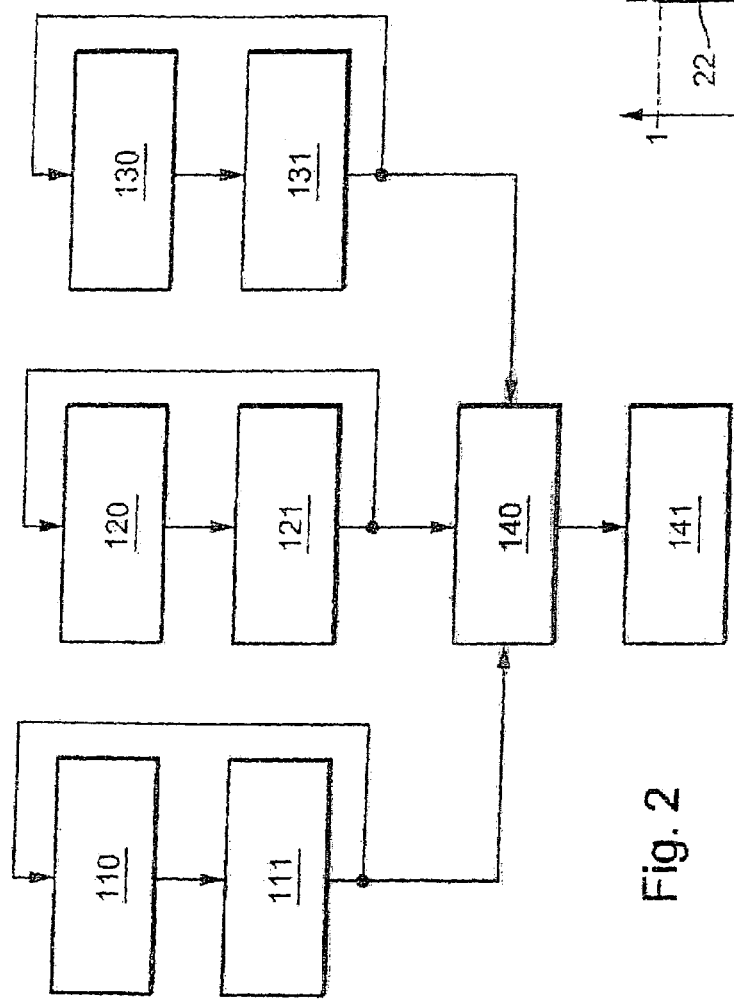
FIG. 2 shows the flow chart of an example method according to the present invention.

FIG. 2 shows the flow diagram of an example method according to the present invention in a schematic depiction. Steps 110, 111; 120, 121; 130, 131 are executed in the control unit and may by all means be carried out in parallel to one another. Steps 140 and 141 are executed in the output stage and are performed in parallel with the execution of the method steps performed in the control unit.

According to step 110, activation profiles 24a, 24b (FIG. 3) are ascertained and subsequently transmitted to output stage 18 via first data line 13 according to step 111. According to step 120, the adaptation sets are ascertained and transmitted to output stage 18 via second data line 14 according to step 121. According to step 130, activation signals 23 are determined in synchronism with the crankshaft rotation. According to step 131, they are then transmitted to output stage 18 via activation-signal lines 12.

According to step 140, the values required to trigger solenoid valve Mi are then determined in output stage 18 on the basis of the available values of the adaptation sets and the activation profiles for a specific solenoid valve Mi (i=1, . . . 5) of a solenoid valve set MGj (j=1, . . . , 3). If an activation profile 24 for mutually corresponding solenoid valves Mi of solenoid valve sets MG1, . . . , MG3 is specified by the four numerical values Ti1, Ti2, Ti3, Ti4 (cf. FIG. 3), and an adaptation set for solenoid valve Mi of solenoid valve set MGj by the four values Aij1, Aij2, Aij3, Aij4, a data set D(Mi, MGj) that characterizes the triggering according to the equation D(Mi,MGj)=(Ti1*Aij1, Ti2*Aij2, Ti2*Aij2, Ti3*Aij3, Ti4*Aij4) will result for this solenoid valve. The values Aijn with n=1, . . . , 4 of an adaptation set are thus scaling factors. According to step 141, solenoid valves Mi of solenoid valve groups MG1, . . . , MG3 are activated according to the arrival of activation signals 23. As an alternative to scaling using factors as it is shown here, the adaptation set may also include correction values directly, which are then linked to the solenoid valve set by addition.

Figure 3:
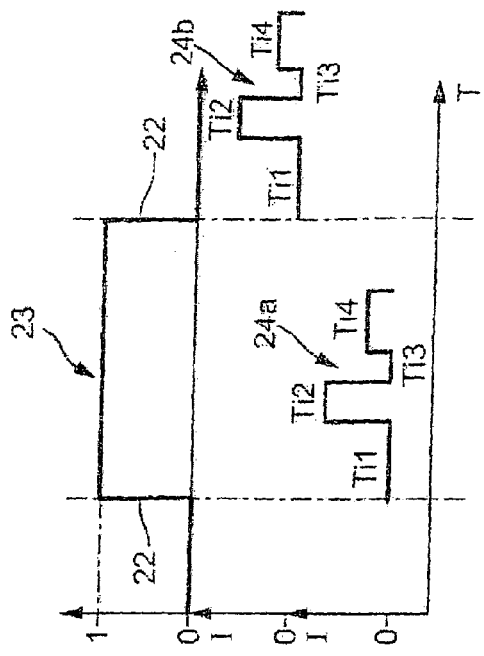
FIG. 3 shows the time characteristic of activation profile and trigger signal.

FIG. 3 shows the time characteristic of an activation signal 23 and, in parallel thereto, the characteristic of two activation profiles 24a, 24b. Activation profiles 24a, 24b are assigned to one solenoid valve Mi in each case. Solenoid valve Mi having activation profile 24a is assigned to an intake valve of the internal combustion engine, while solenoid valve Mi having activation profile 24b is assigned to a discharge valve of the internal combustion engine, both solenoid valves being associated with a solenoid-valve set MGj. Activation signal 23 changes its value in a crankshaft-synchronous manner at the instant of ascending edge slope 21, for instance from 0 to 1. Activation profiles 24a of solenoid valves Mi assigned to the intake valves are established according to this instant. The activation signal has a predefined duration and then changes its value again. This is represented by trailing edge 22. Activation profiles 24b of solenoid valves Mi assigned to the discharge valves are calculated according to this instant.

Each activation profile of a solenoid valve Mi is made up of four consecutive time segments, Ti1, Ti2, Ti3, Ti4. Waiting time Ti1 indicates what time the activation of solenoid valve Mi begins after the particular edge. For the pull-up voltage duration Ti2, solenoid valve Mi has a pull-up current applied. This is followed by a free-flight phase having duration Ti3 during which the solenoid valve is not energized. Next comes holding time Ti4 during which the solenoid valve is energized by a holding current.

Due to adaptation sets Aij, activation profiles 24a, 24b are able to be adapted to the individual conditions of a solenoid valve Mi of solenoid-valve set MGj. Adaptation sets Aij of all solenoid valves Mi, i=1, . . . , 5 of a solenoid-valve set form an adaptation group.

What is claimed is:

1. A method for triggering solenoid valves assigned to gas-exchange valves in an electrohydraulic valve actuation of an internal combustion engine having a plurality of combustion chambers, each of the gas-exchange valves having at least one intake valve and at least one discharge valve, all solenoid valves of all gas exchange valves of a combustion chamber forming a solenoid valve set, the method comprising:
   activating the solenoid valves assigned to the gas-exchange valves independently of each other;
   ascertaining at least crankshaft-synchronous trigger signals for solenoid valves of the internal combustion engine in a control device and transmitting the ascertained trigger signals to an output stage;
   triggering, by the output stage, the solenoid valves based on the transmitted trigger signals;
   specifying an activation profile for all solenoid valves of each of the solenoid valve sets;
   ascertaining, in a control device, a crankshaft-synchronous activation signal for each combustion chamber and supplying the ascertained activation signal to the output stage; and
   activating, by the output stage, the solenoid valves based on the activation signal according to the activation profile specified for each of the solenoid valves.

2. The method as recited in claim 1, wherein a specific activation profile is determined for each individual one of the solenoid valves of each of the solenoid valve sets.

3. The method as recited in claim 1, wherein the activation signal for each individual cylinder is a binary signal.

4. The method as recited in claim 3, wherein the activation signal for each individual cylinder is transmitted to the output stage on a cylinder-specific activation-signal line.

5. The method as recited in claim 3, wherein the output stage activates solenoid valves of a cylinder based on a change in a value of the activation signal of the cylinder according to the activation profile, solenoid valves assigned to the intake valves being activated as a result of a first value change between two values of the activation signal, and solenoid valves assigned to the discharge valves being activated being activated as a result of a second value change between two values of the activation signal, the second value change differing from the first value change.

6. The method as recited in claim 2, wherein each specific activation profile is determined in the control device and transmitted to the output stage via a data line and stored in a memory of the output stage for use in a triggering of the solenoid valves.

7. The method as recited in claim 6, wherein the specific activation profiles stored in the memory of the output stage is updateable during operation of the output stage by values newly ascertained in the control device.

8. The method as recited in claim 6, wherein each activation profile is made up of an indication of a plurality of consecutive time durations.

9. The method as recited in claim 8, wherein each activation profile consists of specifying four consecutive time durations, a first time duration representing a duration of a waiting time, a second time duration representing a duration of an application of a pull-up voltage at the solenoid valve, a third time duration representing a duration of a free-flight phase, and a fourth time duration representing a duration of an application of a holding voltage at the solenoid valve.

10. The method as recited in claim 1, further comprising:
   ascertaining an adaptation set in the control device for solenoid valves, which includes an adaptation of values of the activation profile, the values of the adaptation set being transmitted by the control device to the output stage.

11. The method as recited in claim 1, further comprising:
ascertaining one adaptation group of adaptation sets for each of the solenoid valve set.

12. The method as recited in claim 10, wherein the values of the adaptation sets are transmitted by the control device to the output stage via a second data line.

13. A circuit system for the triggering of solenoid valves assigned to gas-exchange valves, comprising:
a control unit configured to ascertain activation trigger signals for the activation of the solenoid valves;
an output stage, activation trigger signals being transmitted by the control unit to the output stage via lines, a triggering of the solenoid valves being implemented in the output stage;
a data line arranged between the control unit and the output stage for the transmission of activation profiles, the output stage of solenoid valves; and
activation-signal lines arranged between the control unit and the output stage, crankshaft-synchronous activation of actuation of the solenoid valves of cylinders in response to activation signals.

14. The circuit system as recited in claim 13, wherein an activation-signal line is provided between the control unit and the output stage for each cylinder.

15. The circuit system as recited in claim 10, further comprising:
a second data line for transmission of adaptation sets.

16. The circuit system as recited in claim 13, wherein the output stage includes a memory for storing the activation profiles of the solenoid valve.

17. The circuit system as recited in claim 13, wherein the output stage includes a computing unit to determine the trigger signals from the activation profiles and the activation signals.

18. The circuit system as recited in claim 17, wherein the computing unit determines the trigger signals from adaptation sets.

* * * * *